United States Patent Office 3,468,754
Patented Sept. 23, 1969

3,468,754
MODIFIED DIALLYLIC PHTHALATE RESIN SOLUTIONS AND DECORATIVE LAMINATE IMPREGNATED WITH SAME
Frank P. Greenspan, Larchmont, N.Y., and Arthur V. Dupuis, Creve Coeur, Mo., assignors to FMC Corporation, New York, N.Y., a corporation of Delaware
No Drawing. Filed Jan. 21, 1965, Ser. No. 427,082
Int. Cl. B32b *17/08;* C09d *3/64*
U.S. Cl. 161—250                15 Claims

ABSTRACT OF THE DISCLOSURE

A modified diallylic phthalate resin solution comprising diallyl phthalate, a methylol melamine, a catalytic amount of an organic peroxide and a volatile organic solvent which is particularly useful in the preparation of diallylic phthalate resin decorative laminates having improved delamination and mar resistance.

---

This application relates to improved diallylic phthalate resin decorative laminates, and more particularly to modified diallylic phthalate resin solutions which are useful in the preparation of diallylic phthalate resin decorative laminates having improved delamination and mar resistance.

In general the decorative laminate field is dominated by melamine-formaldehyde resins. These resins have the advantage that they are relatively inexpensive and can be used to prepare dry, resin-impregnated carrier sheets for laminate production. The decorative surface for these laminates is generally provided by a decorative paper printed with some decorative design such as wood grain. Attempts have been made to use these resins in the preparation of decorative laminates having a wood veneer as the decorative surface. Such laminates have an aesthetic quality known as "depth" which is not possessed by imitation wood laminates. However, attempts to produce wood veneer laminates from melamine-formaldehyde resins have not been successful since the laminating pressures required to cure these resins crush the wood veneer thus causing a complete loss of the "depth" quality.

In U.S. Patent No. 3,108,030, B. S. Taylor describes a method of preparing wood veneer decorative laminates having "depth" using diallyl phthalate resin. These laminates are prepared by impregnating an unpigmented fibrous carrier sheet with a diallyl phthalate resin solution, drying the resin-impregnated overlay sheet, and laminating it to a wood veneer. However, in the practice of his invention various problems have been encountered. One of the problems is that the interlaminar bond between the resin-impregnated overlay sheet and the wood veneer is inferior to that obtained between the laminae of other types of diallyl phthalate decorative laminates. A poor laminar bond is evidenced by flaking of resin from the surface of the laminate when it is cut with a sharp knife in a closely lined crosshatch pattern. Another problem is that the mar resistance of these wood veneer laminates is inferior to that obtained with other types of decorative laminates prepared from diallyl phthalate resins. This diminished mar resistance is evidenced by the formation of a permanent white mar when the surface of the laminate is scraped heavily with a blunt object such as the edge of a coin.

It is an object of this invention to improve the delamination and mar resistance of diallylic phthalate resin decorative laminates. Another object is to provide diallylic phthalate resin solutions which can be used to produce diallylic phthalate resin decorative laminates having an improved delamination and mar resistance. Still another object is to provide diallylic phthalate resin-impregnated overlay sheets which can be used to produce diallylic phthalate resin decorative laminates having an improved delamination and mar resistance. These and other objects will become apparent from the following description of this invention.

We have now discovered that the delamination and mar resistance of diallylic phthalate resin decorative laminates can be improved by preparing the laminate from a diallylic phthalate resin solution which comprises (a) diallylic phthalate, 85–100% by weight of the diallylic phthalate being partial polymer and the remaining 0–15% being monomer, (b) 0.1–10% by weight, based upon the diallylic phthalate, of a methylol melamine selected from the group consisting of poly(lower-alkylated methylol) melamines, poly(allylated methylol)melamines, and mixtures thereof, (c) a catalytic amount of organic peroxide, and (d) a volatile organic solvent. Quite surprisingly, the presence of the methylol melamine in the resin solution provides diallylic phthalate resin decorative laminates having improved delamination and mar resistance. Improved wood veneer decorative laminates can be prepared by impregnating an unpigmented, fibrous carrier sheet with the modified diallylic phthalate resin solution of this invention, drying the resin-impregnated overlay sheet, and laminating it to a wood veneer.

The major resinous component of the modified resin solution of this invention is diallylic phthalate resin. By "diallylic phthalate" we mean diallyl, dimethallyl and dicrotonyl esters of ortho-, iso- and tere-phthalic acids. These diallylic phthalates polymerize by addition polymerization through the allylic unsaturation, first forming a partial polymer dissolved in unreacted monomer. On further polymerization of this partial polymer solution, gelation of the medium occurs during which the partial polymer is crosslinked to an infusible, insoluble, thermosetting resin.

Diallylic phthalate partial polymers may be prepared by standard polymerization techniques, such as emulsion, solution or bulk polymerization, usually with a peroxide catalyst, as described by Pollack et al. in U.S. Patent No. 2,273,891. A preferred method for conducting this polymerization is described by C. A. Heiberger in U.S. Patent No. 3,096,310.

As the diallylic phthalate polymerization reaction is allowed to proceed, the viscosity of the medium increases slowly at first, and then rapidly as the gel-point of the medium is approached. The reaction is terminated before gelation occurs, normally at about 25–35% conversion of monomer to partial polymer. The ploymerization may be terminated by any standard procedure such as lowering the temperature, adding a solvent for the monomer which precipitates the partial polymer, or adding a ploymerization inhibitor. The partial polymer is separated from monomer and residual solvent by known procedures, such as by stripping off volatile components, or dissolving the monomer in an appropriate solvent.

Diallylic phthalate partial polymers are acetone-soluble, fusible, linear or slightly branched, solid polymers containing residual unsaturation. The number average molecular weight of these partial polymers is generally below about 25,000, and most commonly below about 10,000. These partial polymers are generally characterized by their precipitated polymer viscosity which is measured as a 25% solution of the partial polymer in monomer at 25° C. The precipitated polymer viscosity is generally in the range of about 100–1,000 centipoises, and preferably about 200–700 centipoises. Curing of these solid partial polymers produces a thermoset resin having excellent physical and chemical properties.

Delamination and mar resistance is improved in accordance with this invention by adding to the diallylic phthalate resin solution a methylol melamine of the group consisting of poly(lower-alkylated methylol)melamines, poly(allylated methylol)melamines, and mixtures thereof. By "mixtures thereof" we means physical mixtures as well as methylol melamines which are partially alkylated and partially allylated. By "poly" we mean about three or more. Theoretically it is possible to substitute all six of the active hydrogens on the melamine ring but quite often reaction stops after an average of a little over five substitutions. At least about three alkylated and/or allylated methylol groups are necessary to provide compatibility with the system. By "allylated" we means condensation with an allylic group such as allyl, methylallyl or crotonyl.

These methylol melamines are prepared by reacting one mole of melamine with six moles of formaldehyde in the presence of an excess of a lower-alkyl or allylic alcohol. Suitable alcohols include methyl, ethyl, propyl, isopropyl, allyl, butyl, isobutyl, sec-butyl, methallyl, crotonyl, pentyl, amyl, hexyl, and methylamyl. Mixed alcohols can also be used. When an equimolar amount of methyl and allyl alcohol is present, a novel compound, tri(methoxymethyl) tri(alloxymethyl)melamine, is produced. Hexa(methoxymethyl)melamine is commercially available.

When a lower-alkylated methylol melamine is used in accordance with this invention, improvement in delamination resistance only is obtained. Higher-alkylated methylol melamines in which the alkyl group contains more than about six carbon atoms, give no improvement in delamination resistance. Improvement in mar resistance is obtained by using an allylated methylol melamine. When a mixed lower-alkylated and allylated methylol melamine is used, both delamination and mar resistance is improved.

The modified diallylic phthalate resin solutions of this invention comprise diallylic phthalate partial polymer, generally some diallylic phthalate monomer, the methylol melamine, an organic peroxide, and a volatile organic solvent. At least about 85% of the diallylic phthalate present in the resin solution should be present as partial polymer and the remaining about 0–15% as monomer. Preferably, the monomer is present in an amount of about 5–10% to facilitate escape of volatile solvent from the resin surface during drying, and to improve resin flow during lamination. If more than about 15% of the diallyl phthalate is monomer, the dried overlay sheet will generally be sticky and hard to handle.

The methylol melamine should be present in the resin solution in an amount of about 0.1–10% by weight, based upon the total diallylic phthalate monomer and partial polymer. More than about 10% of the melamine compound gives no further improvement in laminar bond or mar resistance. Preferably the resin solution contains about 0.5–5% by weight of the methylol melamine.

The resin solution should also contain a catalytic amount of an organic peroxide to catalyze the final cure of the resin. There is no advantage in using more than about 5% by weight of peroxide, based on the diallylic phthalate, while at least about 0.5% is required for complete cure. Preferably, the peroxide is present in an amount of about 2–3%. Useful peroxides include diacyl peroxides such as benzoyl peroxide, p-chlorobenzoyl peroxide, 2,4-dichlorobenzoyl peroxide, lauroyl peroxide and succinic acid peroxide, dialkyl peroxides such as dicumyl peroxide and di-tert.-butyl peroxide, ketone and aldehyde peroxides such as methyl ethyl ketone peroxide, cyclohexanone peroxide and hydroxyheptyl peroxide, hydroperoxides such as tert.-butyl hydroperoxide, p-menthane hydroperoxide, pinane hydroperoxide, cumene hydroperoxide and 2,5-dimethylhexane-2,5-dihydroperoxide, peroxy esters such as tert.-butyl perbenzoate, 2,5-dimethylhexane-2,5-di(peroxybenzoate), di-tert.-butyl diperphthalate, tert.-butyl peracetate, tert.-butyl peroxyisobutyrate and isopropyl percarbonate, as well as many other organic peroxides which have been described in the literature.

Generally, the resin solution also contains about 2–5% by weight based on the diallylic phthalate of an internal release agent such as lauric acid, carnauba wax or beeswax. However, external release agents or other processing techniques may also be used instead of an internal release agent.

The resin solution may also contain minor amounts of other additives to impart special properties, if desired. For example, it may contain a small amount of allylated melamine as described by F. P. Greenspan in copending application Ser. No. 427,128, filed Jan. 25, 1965, to improve mar resistance of the final laminate, especially when the methylol melamine used in accordance with this invention is alkylated methylol melamine. The resin solution may also contain minor amounts of a finely divided solid to improve surface gloss and abrasion resistance of the final laminate as described by A. V. Dupuis in U.S. Patent No. 3,154,454.

The resin solution is prepared by dissolving all of these components in a volatile organic solvent, which may be any of the conventional solvents useful for dissolving diallylic phthalate partial polymers. Useful solvents include low molecular weight ketones such as acetone, methyl ethyl ketone and methyl isobutyl ketone, aromatics such as benzene, toluene, xylene and isopropyl benzene, esters such as ethyl acetate and butyl acetate, and many other solvents which can be evaporated after impregnation of the carrier sheet. Since the viscosity of the impregnating solution and the rate at which the solvent will evaporate, vary with each particular solvent, the choice of solvent will depend to some extent upon the processing techniques used in preparing the overlay sheet. In some cases it may be desirable to use a mixture of solvents.

The resin solution should contain enough solvent to provide thorough impregnation of the carrier sheet, while at the same time having a resin content sufficient to provide the desired resin pickup during impregnation. The resin content of the impregnating solution may vary from about 25–70%, depending on the particular solvent system used. It is especially convenient to operate in the range of about 30–50% resin content for most solvents.

Overlay sheets which produce decorative laminates having improved delamination and mar resistance are prepared by impregnatig a fibrous carrier sheet with the modified resin solution of this invention. The fibrous carrier sheet may be either a paper or a non-woven fabric. Suitable fibrous materials for making these sheets include polyacrylonitrile, alpha-cellulose, rayon and cotton. The fibers may be of any suitable length. Papers are generally made from fibers less than about 1 inch in length, while non-wovens are generally prepared from fibers at least about ½ inch in length.

The thickness of the carrier sheet may vary from about 2–10 mils, and usually will be about 4–7 mils. Papers generally have a thickness of about 2–8 mils, while nonwovens are generally about 3–10 mils. The denier of the fiber is not critical and generally will be in the range of about 1–5. The basis weight of the carrier sheet will generally be about 10–40 pounds per 3,000 square feet, and preferably about 15–30. The carrier sheet should be unpigmented and preferably color-free, although printed or tinted carrier sheets may be used to produce unusual decorative effects, if desired.

The fibrous carrier sheet should be impregnated to a resin content of about 70–90% by weight of the dried, resin-impregnated overlay sheet, and preferably about 75–85%. By "resin content" we mean the increase in weight of the carrier sheet after impregnation and drying. When the carrier sheet is impregnated to a resin content of less than about 70%, the final laminate has resin-starved areas on the surface which can be observed as dull spots. On the other hand, when the carrier sheet is impregnated to a resin content of more than about 90%, there is insufficient reinforcing fiber present, and the final laminate is susceptible to checking and cracking.

The carrier sheet may be impregnated with resin using conventional equipment and techniques, wherein the sheet is passed through or dipped into a tank containing the impregnating solution. The amount of resin pickup may be controlled by adjusting the rate at which the carrier sheet is passed through the solution, varying the solvent and the resin content of the impregnating solution, or using matering rolls, doctor blades, transfer rolls, or other standard saturating equipment. The impregnation is conveniently carried out at room temperature, followed by evaporation of the solvent at elevated temperature. The resin content of the overlay sheet is readily determined by weighing a sample of untreated carrier sheet and a sample of dried, impregnated overlay sheet and expressing the difference as the resin content.

After the desired resin content has been obtained on the carrier sheet, the sheet is dried to remove the volatile solvent. The drying conditions should be carefully controlled to remove nearly all of the volatiles present while avoiding premature curing of the resin. In general, no more than about 8% volatiles should remain in the overlay sheet after drying, with a preferred residual volatile content in the range of about 3–5%. Residual volatile content is measured as the weight loss obtained upon heating a sample of the dried, impregnated overlay sheet at a temperature of 320° F. for 8 minutes.

The conditions chosen for drying the overlay sheet will, of course, depend on the amount of solvent present, the particular solvent used, and the speed at which the impregnated sheet is passed through the drying oven. Drying should be carried out gradually, to prevent the formation of blisters which result in craters in the final product. Drying temperatures of about 150–275° F. and drying times of about 1–6 minutes will reduce acetone solvent retention to an acceptable level, whereas slightly different ranges may be used for other solvents. After drying, the overlay sheet can be bent or rolled without cracking, cut without flaking or chipping, and stored for prolonged periods without blocking or advancing in cure.

Decorative laminates having improved delamination and mar resistance are prepared from these overlay sheets by laminating the overlay sheet to a wood veneer. Wood veneers are normally made of hardwood, such as walnut, mahogany, birch or maple, and are applied commercially in thicknesses of $\frac{1}{16}$ inch, $\frac{1}{28}$ inch, or thinnner, since thick veneers are less economical to use. These veneers are generally glued to a core board of the desired thickness, weight and composition, using a strong adhesive. Any of the conventional core boards which are reasonably rigid, have two parallel surfaces, and uniform compressibility may be used. Typical core materials include plywood, hardboard, particle board, flake board, lumber core, cement-asbestos board and gypsum board. The board should be thermally stable at the laminating temperatures, or special precautions may be required. For example, if a urea-formaldehyde resin binder is present, or the boards are of high moisture content, it is preferred to pre-dry the boards to a minimum moisture and volatile content. Since it is desirable to avoid the formation of steam and other volatiles during lamination, boards such as gypsum board which calcines should be pretreated before lamination.

To prevent warping, either the core board should be balanced with a resin surface on both sides, or the reverse side should be provided during lamination with some inexpensive resin film, typically a sheet of phenolic resin-impregnated kraft paper with a glassine paper separator. The type and character of the core board used for the veneer will determine the extent to which balancing or equalization is required. All types of hardboard and most plywoods must be balanced to a greater or lesser degree to compensate for the slight resin shrinkage that occurs and to equalize the rate of water absorption through the two faces. Boards which have a high internal bond strength and a high resistance to moisture, or are very thick, or are wood veneered on both faces, may not require additional equalization.

Lamination of the overlay sheet to the wood veneer may be accomplished using a standard platen press with one or more openings. Laminates can be cured with multiple openings either "face-to-face," using a caul finished on both sides, or "back-to-back" using two cauls, each finished on one side only. Either stainless steel or aluminum cauls of any desired finish, such as matte, satin, furniture finish or gloss, may be used. The cauls are generally treated with a release agent such as lauric acid or a silicone. The desired surface finish may also be obtained through the use of release or separating papers such as cellophane or papers coated or treated with release agents such as silicones, which papers are inserted between the caul plate and the resin-impregnated overlay sheet.

The overlay sheet should be laminated to the wood veneer at a temperature and pressure and for a time sufficient to convert the diallylic phthalate to a thermoset resin. The laminating pressure need only be high enough to consolidate the resin and to provide sufficient resin flow to bond the resin-impregnated overlay sheet to the wood veneer. The necessary pressure will depend upon such factors as the density and surface of the wood veneer, and the resin content and flow characteristics of the overlay sheet.

Laminating pressures approaching contact pressure, and as high as about 400 p.s.i., have been used successfully. For most laminates a convenient pressure is in the range of about 50–300 p.s.i. If it is desired to laminate at pressures in excess of 350 p.s.i., it may be advisable to use overlay sheets in which the resin flow has been retarded by slightly advancing the cure of the resin during the drying operation, or in which the resin is free of monomer, since high laminating pressures are known to reduce the thickness of the resin film on the laminate.

The laminating temperature should be high enough to activate the catalyst, and to provide a reasonable rate of cure. For commercial operations, high curing temperatures are preferred since they provide shorter curing cycles, and thus increase productivity. In practice, the maximum laminating temperature is generally controlled by the heat stability of the wood veneer and the core board. Curing temperatures of about 400° F. have been used for 5 minutes without charging core boards such as "Masonite," a lignocellulose hardboard. Lower temperatures, of course, require longer curing times; temperatures as low as about 200° F. have been used for prolonged periods. Temperatures in the range of about 275–375° F. are preferred, since within this range the rate of polymerization is reasonable, and no significant decomposition or degradation of the laminate is experienced. Although the laminating time may vary over wide limits depending upon the temperature and pressure, times of about 5–30 minutes are generally employed. Preferably laminating times of about 10–20 minutes are used. It is not necessary to cool the cured laminate in the press before removal.

Although the use of overlay sheets impregnated with the modified diallylic phthalate resin solution of this invention has been described in terms of decorative laminates in which the decorative layer is a wood veneer, their use is not restricted to this application. It is contemplated that these overlay sheets could also be used in the preparation of other types of decorative laminates in which poor laminar bond or mar resistance is encountered. For example, these overlay sheets may be useful in decorative laminates in which the decorative layer is a cellulosic material other than a wood veneer or is impregnated with a resin other than diallylic phthalate resin.

The following examples, illustrating the modified diallylic phthalate resin solutions of this invention and the overlay sheets and improved decorative laminates produced therefrom, are presented without any intention that the invention be limited thereto. All parts and percentages are by weight unless otherwise indicated.

EXAMPLE 1

A typical diallyl phthalate partial polymer was prepared as follows: Eight thousand eight hundred sixty pounds of diallyl ortho-phthalate monomer, 622 lbs. of isopropanol (91% by vol.) and 75 lbs. of hydrogen peroxide (50.5% $H_2O_2$) were charged to a 1,500 gal. stainless steel reactor, thoroughly agitated and heated to a pot temperature of 104–108° C. at total reflux. After 10 hrs. the viscosity of the reaction mixture had increased to 27 cps. at 106° C., as measured by a Bendix Ultraviscoson computator. The batch was cooled, to obtain a reaction product having a viscosity of 425 cps. at 25° C. This polymeric reaction product, which consists of 27% partial polymer, 67% unreacted monomer and 6% isopropanol, was mixed intimately with 48,000 lbs. of isopropanol (91% by vol.) and the partial polymer precipitated at 0° C. The solid polymer was separated by filtration and dried, to yield a 27.6% conversion of monomer to polymer. The properties of the partial polymer obtained by this process were:

| | |
|---|---|
| P.P.V., cps. at 25° C. | 354 |
| Softening range C° | 80–105 |
| Iodine No. | 55 |
| Sp. gr. at 25° C. (ASTM D792–50) | 1.267 |

The P.P.V. given above is the precipitated polymer viscosity of a 25% solution of polymer in monomer at 25° C.

A diallyl phthalate resin-impregnated overlay sheet was prepared as follows: An unpigmented, non-woven fabric, 7 mils thick, with a basis weight of 18 lbs. per 3,000 sq. ft. and containing 100% polymeric fibers in which the polymer forming units were 95% acrylonitrile and 5% vinylpyridine, 1.25 in. long and 3 denier, was impregnated by passing at the rate of 20 ft. per min. through a solution of the following composition:

| | Parts |
|---|---|
| Diallyl ortho-phthalate partial polymer | 98 |
| Diallyl ortho-phthalate monomer | 2 |
| Hexa(methoxymethyl)melamine | 3 |
| tert.-Butyl perbenzoate | 3 |
| Lauric acid | 2 |
| Acetone | 250 |

The impregnated sheet was dried in a 2-zone oven at 250° F. for 1.5 min. and at 230° F. for 1.5 min. to produce a tack-free overlay sheet having a resin content of 83% and a volatile content of 4.5%. Resin content was measured by weighing samples of untreated and dried, impregnated carrier sheet and expressing the difference as the amount of resin on the carrier sheet. Percent volatiles was measured as the percent weight loss after heating a sample of the overlay sheet for 8 min. at 320° F.

A wood veneer decorative laminate was prepared from the dry, resin-impregnated overlay sheet as follows: The above overlay sheet was laminated to a walnut veneer ⅛ inch in thickness, preglued to a particle board ¾ inch thick and having a density of 0.66 g./cm.³, which had been predried for 5 minutes at 350° F. The layup consisted of a slip caul, a sheet of glassine separator paper, a sheet of phenolic-impregnated kraft paper as a balancing sheet, the veneered particle board, the resin-impregnated overlay sheet, and a polished aluminum caul plate. The layup was cured in a laminating press by heating for 10 min. at 325° F., under a pressure of 150 p.s.i. The laminate was removed from the press and the cauls stripped off, to produce a smooth, glossy finish laminate. When the laminate was cut in a closely lined crosshatch pattern with a sharp knife, no flaking of resin from the surface or other evidence of poor laminar bond was observed.

For comparison, the above example was repeated except that the impregnating solution did not contain any melamine compound. When the resulting laminate was cut in a closely lined crosshatch pattern with a sharp knife, flaking of resin from the surface was observed.

EXAMPLE 2

A diallyl phthalate resin-impregnated overlay sheet was prepared as follows: An unpigmented, non-woven sheet, 8 mils thick, with a basis weight of 20 lbs. per 3,000 sq. ft. and containing 100% polymeric fibers in which the polymer forming units were 95% acrylonitrile and 5% vinylpyridine, 1.25 in. long and 3 denier, was impregnated by passing at the rate of 12 ft. per min. through a solution of the following composition:

| | Parts |
|---|---|
| Diallyl ortho-phthalate partial polymer | 93 |
| Diallyl ortho-phthalate monomer | 7 |
| Hexa(methoxymethyl)melamine | 1.5 |
| Diallylmelamine | 1.5 |
| tert.-Butyl perbenzoate | 3 |
| Lauric acid | 3 |
| Acetone | 200 |

The impregnated sheet was dried at 240° F. for 5 min. to produce a tack-free impregnated overlay sheet having a resin content of 82% and a volatile content of 5%.

A wood veneer decorative laminate was prepared from this dry, resin-impregnated overlay sheet as follows: The above overlay sheet was laminated to a 0.75 in. walnut-veneered Timblend particle board which had been predried for 10 min. at 320° F. The layup consisted of a slip caul followed by a sheet of glassine separator paper, a sheet of phenolic-impregnated kraft paper as a balancing sheet, the walnut-veneered particle board, the resin-impregnated overlay sheet, and a polished aluminum caul plate. The layup was cured in a laminating press by heating for 14 min. at 325° F., under a pressure of 100 p.s.i. When the resulting laminate was cut in a closely lined crosshatch pattern with a sharp knife, no flaking of resin from the surface or other evidence of poor laminar bond was observed.

EXAMPLE 3

A diallyl phthalate resin-impregnated overlay sheet was prepared as follows: An unpigmented paper, 5 mils thick, with a basis weight of 20 lbs. per 3,000 sq. ft. and containing 80% polymeric fibers in which the polymer forming units were 95% acrylonitrile and 5% vinylpyridine, 0.25 in. long and 2 denier, and 20% alpha-cellulose fibers was impergnated by passing at the rate of 7 ft. per min. through a solution of the following composition:

| | Parts |
|---|---|
| Diallyl ortho-phthalate partial polymer | 93 |
| Diallyl ortho-phthalate monomer | 7 |
| Hexa(methoxymethyl)melamine | 5 |
| Diallylmelamine | 5 |
| tert.-Butyl perbenzoate | 3 |
| Lauric acid | 3 |
| Methyl ethyl ketone | 200 |

The impregnated sheet was dried in a 2-zone oven at 220° F. for 2.5 min. and at 260° F. for 2.5 min. to produce a tack-free overlay sheet having a resin content of 78% and a volatile content of 4.0%.

A wood veneer decorative laminate was prepared from this dry, resin-impregnated overlay sheet as follows: The above overlay sheet was laminated to a 0.75 in. walnut-veneered Timblend particle board which had been predried for 10 min. at 320° F. The layup consisted of a slip caul followed by a sheet of glassine separator paper, a sheet of phenolic-impregnated kraft paper as a balancing sheet, the walnut-veneered particle board, the resin-impregnated overlay sheet, and a polished aluminum caul plate. The layup was cured in a laminating press by heating for 18 min. at 320° F., under a pressure of 100 p.s.i. When the resulting laminate was cut with a sharp knife in a closely lined crosshatch pattern, no flaking of resin from the surface or other evidence of poor laminar bond was observed.

EXAMPLE 4

Tri(methoxymethyl)tri(alloxymethyl)melamine was prepared by refluxing a mixture containing 396 parts of hexa(methoxymethyl)melamine, 348 parts of allyl alcohol, and 1 part of sodium methylate for 5 hours. The product was found to contain somewhat in excess of 2 allyl groups per molecule.

A diallyl phthalate resin-impregnated overlay sheet was prepared as follows: An unpigmented, calendered overlay paper, 3 mils thick, with a basis weight of 18 lbs. per 3,000 ft. and containing 100% polymeric fibers in which the polymer forming units were 88% acrylonitrile and 12% methyl methacrylate, ¼ in. long and 3 denier, was impregnated by passing at a rate of 8 ft. per min. through a solution of the following composition:

| | Parts |
|---|---|
| Diallyl ortho-phthalate partial polymer | 93 |
| Diallyl ortho-phthalate monomer | 7 |
| Tri(methoxymethyl)tri(alloxymethyl)melamine | 3 |
| 2,5-dimethylhexane-2,5-di(peroxybenzoate) | 2 |
| Lauric acid | 3 |
| Acetone | 200 |

The impregnated sheet was dried for 5 min. at 230° F. to produce a tack-free overlay sheet having a resin content of 75% and a volatile content of 5.0%.

A wood veneer decorative laminate was prepared from this dry, resin-impregnated overlay sheet as follows: The above overlay sheet was laminated to a 0.75 in. birch-veneered Timblend particle board which had been predried for 10 min. at 320° F. The layup consisted of a slip caul followed by a glassine separator paper, a phenolic-impregnated kraft paper, the birch-veneered particle board, the resin-impregnated overlay sheet, and a polished aluminum caul plate. The layup was cured in a laminating press by heating for 18 min. at 320° F. under a pressure of 135 p.s.i. The delamination resistance of the resulting laminate was tested by cutting it in a closely lined crosshatch pattern with a sharp knife. No flaking of resin from the surface or other evidence of poor laminar bond was observed. The mar resistance of the laminate was tested by rubbing it hard using an Organic Coating Adhesion Tester. No white mar appeared.

EXAMPLE 5

A dimethallyl phthalate resin-impregnated overlay sheet was prepared as follows: An unpigmented, non-woven fabric, 6 mils thick, with a basis weight of 20 lbs. per 3,000 sq. ft. and containing 100% polymeric fibers in which the polymer forming units were 85% acrylonitrile and 15% vinyl acetate, 1.25 in. long and 1.5 denier, was impregnated by passing at a rate of 6 ft. per min. through a solution of the following composition:

| | Parts |
|---|---|
| Dimethallyl ortho-phthalate partial polymer | 89 |
| Diallyl ortho-phthalate monomer | 11 |
| Hexa(ethoxymethyl)melamine | 3 |
| tert.-Butylperbenzoate | 4 |
| Lauric acid | 3 |
| Acetone | 180 |

The impregnated sheet was dried for 5 min. at 230° F. to produce a tack-free overlay sheet having a resin content of 80% and a volatile content of 5.2%.

A wood veneer laminate was prepared from this dry, resin-impregnated overlay sheet as follows: The above overlay sheet was laminated to 0.5 in. maple-veneered plywood board which had been predried for 10 min. at 320° F. The layup consisted of a slip caul, a glassine separator paper, a phenolic-impregnated kraft paper, the maple-veneered plywood board, the resin-impregnated overlay sheet, and a polished aluminum caul plate. The layup was cured in a laminating press by heating for 15 min. at 310° F., under a pressure of 150 p.s.i. When the resulting laminate was cut with a sharp knife in a closely lined crosshatch pattern, no flaking of resin from the surface or other evidence of poor laminar bond was observed.

EXAMPLE 6

A diallyl isophthalate resin-impregnated overlay sheet was prepared as follows: An unpigmented, non-woven sheet, 8 mils thick, with a basis weight of 20 lbs. per 3,000 sq. ft. and containing 100% polymeric fibers in which the polymer forming units were 95% acrylonitrile and 5% vinylpyridine, 1.25 in. long and 3 denier, was impregnated by passing at the rate of 10 ft. per min. through a solution of the following composition:

| | Parts |
|---|---|
| Diallyl isophthalate partial polymer | 93 |
| Diallyl isophthalate monomer | 7 |
| Hexa(butoxymethyl)melamine | 3 |
| tert.-Butyl perbenzoate | 3 |
| Lauric acid | 3 |
| Acetone | 200 |

The impregnated sheet was dried at 240° F. for 5 min. to produce a tack-free impregnated overlay sheet having a resin content of 86% and a volatile content of 3.5%.

A wood-veneer decorative laminate was prepared from the dry, resin-impregnated overlay sheet as follows: The above overlay sheet was laminated to a 0.5 in. mahogany-veneered plywood board which had been predried for 12 min. at 320° F. to remove moisture. The layup consisted of a slip caul, a sheet of glassine separator paper, a sheet of phenolic-impregnated kraft paper as a balancing sheet, the mahogany-veneered plywood board, the resin-impregnated overlay sheet, and a polished aluminum caul plate. The layup was cured in a laminating press by heating for 12 min. at 330° F. under a pressure of 200 p.s.i. When the resulting laminate was cut in a closely lined crosshatch pattern, no flaking of resin from the surface or other evidence of poor laminar bond was observed.

EXAMPLE 7

A diallyl ortho-phthalate resin-impregnated overlay sheet was prepared as follows: An unpigmented, non-woven sheet, 8 mils thick, with a basis weight of 20 lbs. per 3,000 sq. ft. and containing 100% polymeric fibers in which the polymer forming units were 95% acrylonitrile and 5% vinylpyridine, 1.25 in. long and 3 denier, was impregnated by passing at the rate of 11 ft. per min. through a solution of the following composition:

| | Parts |
|---|---|
| Diallyl ortho-phthalate partial polymer | 93 |
| Diallyl ortho-phthalate monomer | 7 |
| Hexa(alloxymethyl)melamine | 3 |
| tert.-Butyl perbenzoate | 3 |
| Lauric acid | 3 |
| Acetone | 200 |

The impregnated sheet was dried at 240° F. for 5 min. to produce a tack-free impregnated overlay sheet having a resin content of 82% and a volatile content of 4%. The hexa(alloxymethyl)melamine was prepared in the manner described in U.S. Patent No. 2,986,541.

A wood-veneer decorative laminate was prepared from the dry, resin-impregnated overlay sheet as follows: The above overlay sheet was laminated to a 0.5 in. walnut-veneered plywood board which had been predried for 12 min. at 320° F. to remove moisture. The layup consisted of a slip caul, a sheet of glassine separator paper, a sheet of phenolic-impregnated kraft paper as a balancing sheet, the walnut-veneered plywood board, the resin-impregnated overlay sheet, and a polished aluminum caul plate. The layup was cured in a laminating press by heating for 12 min. at 330° F. under a pressure of 200 p.s.i. When the resulting laminate was rubbed hard with a coin, no white mar or other evidence of poor mar resistance was observed.

EXAMPLE 8

Tri(methoxymethyl)melamine was prepared as follows: One hundred twenty-six parts of melamine were dissolved in 99 parts of aqueous formaldehyde at a preadjusted pH of 6.4. The mixture was heated under agitation until the melamine had completely dissolved, after which 320 parts of methyl alcohol containing 0.6 part of oxalic acid, was added. The mixture was heated at 65° C. for 15 minutes, after which the pH was adjusted to 9 and the product was concentrated by vacuum distillation to remove excess methyl alcohol.

A diallyl phthalate resin-impregnated overlay sheet was prepared as follows: An unpigmented paper, 5 mils thick, with a basis weight of 20 lbs. per 3,000 sq. ft. and containing 80% polymeric fibers in which the polymer forming units were 95% acrylonitrile and 5% vinyl pyridine, 0.25 in. long and 2 denier, and 20% alpha-cellulose fibers was impregnated by passing at the rate of 7 ft. per min. through a solution of the following composition:

| | Parts |
|---|---|
| Diallyl ortho-phthalate partial polymer | 93 |
| Diallyl ortho-phthalate monomer | 7 |
| Tri(methoxymethyl)melamine | 5 |
| tert.-Butyl perbenzoate | 3 |
| Lauric acid | 3 |
| Methyl ethyl ketone | 200 |

The impregnated sheet was dried in a 2-zone oven at 220° F. for 2.5 min. and at 260° F. for 2.5 min. to produce a tack-free overlay sheet having a resin content of 78% and a volatile content of 4.0%.

A decorative laminate was prepared as follows: The above overlay sheet was laminated to a 0.75 in. walnut-veneered Timblend particle board which had been pre-dried for 10 min. at 320° F. The layup consisted of a slip caul followed by a sheet of glassine separator paper, a sheet of phenolic-impregnated kraft paper as a balancing sheet, the walnut-veneered particle board, the resin-impregnated overlay sheet, and a polished aluminum caul plate. The layup was cured in a laminating press by heating for 18 min. at 320° F., under a pressure of 100 p.s.i. When the resulting laminate was cut in a closely lined crosshatch pattern with a sharp knife, no flaking of resin from the surface or other evidence of poor laminar bond was observed.

EXAMPLE 9

Tri(alloxymethyl)melamine was prepared in accordance with the procedure set forth in Example 8 for preparing tri(methoxymethyl)melamine except that 580 parts of allyl alcohol were used rather than methyl alcohol.

A resin-impregnated overlay sheet was prepared in accordance with the procedure set forth in Example 8 except that 5 parts of tri(alloxymethyl)melamine were used rather than tri(methoxymethyl)melamine.

A decorative laminate was prepared in accordance with the procedure set forth in Example 8 using the above overlay sheet. When the resulting laminate was rubbed hard using an Organic Coating Adhesion Tester, no white mar was observed.

What is claimed is:

1. A modified diallylic phthalate resin solution comprising (a) diallylic phthalate, 85–100% by weight of the diallylic phthalate being partial polymer and the remaining 0–15% being monomer, (b) 0.1–10% by weight, based on the diallylic phthalate, of a methylol melamine selected from the group consisting of poly(lower-alkylated methylol)melamines, poly(allylated methylol)melamines, and mixtures thereof, (c) a catalytic amount of organic peroxide, and (d) a volatile organic solvent.

2. The modified diallylic phthalate resin solution of claim 1 in which 0.5–5% by weight, based on the diallylic phthalate, of the methylol melamine is present.

3. The modified diallylic phthalate resin solution of claim 2 in which the diallylic phthalate is diallyl ortho-phthalate.

4. The modified diallylic phthalate resin solution of claim 3 in which the methylol melamine is hexa(methoxymethyl)melamine.

5. The modified diallylic phthalate resin solution of claim 4 in which the methylol melamine is tri(methoxymethyl)tri(alloxymethyl)melamine.

6. A dry, diallylic phthalate resin-impregnated overlay sheet comprising an unpigmented, fibrous carrier sheet impregnated with diallylic phthalate, 85–100% by weight of the diallylic phthalate being partial polymer and the remaining 0–15% being monomer, 0.1–10% by weight, based on the diallylic phthalate of a methylol melamine selected from the group consisting of poly(lower-alkylated methylol)melamines, poly(allylated methylol)melamines, and mixtures thereof, and a catalytic amount of organic peroxide.

7. The dry, diallylic phthalate resin-impregnated overlay sheet of claim 6 in which 0.5–5% by weight, based on diallylic phthalate, of the methylol melamine is present.

8. The dry, diallylic phthalate resin-impregnated overlay sheet of claim 7 in which the diallylic phthalate is diallyl ortho-phthalate.

9. The dry, diallylic phthalate resin-impregnated overlay sheet of claim 8 in which the methylol melamine is hexa(methoxymethyl)melamine.

10. The dry, diallylic phthalate resin-impregnated overlay sheet of claim 9 in which the methylol melamine is tri(methoxymethyl)tri(alloxymethyl)melamine.

11. A diallylic phthalate resin decorative laminate which comprises an unpigmented, fibrous carrier sheet impregnated with thermoset resin derived from diallylic phthalate and 0.1–10% by weight, based on the diallylic phthalate, of a methylol melamine selected from the group consisting of poly(lower-alkylated methylol)melamines, poly(allylated methylol)melamines, and mixtures thereof, and laminated to a wood veneer.

12. The diallylic phthalate resin decorative laminate of claim 11 in which the carrier sheet is impregnated with 0.5–5% by weight, based on the diallylic phthalate, of the methylol melamine.

13. The diallylic phthalate resin decorative laminate of claim 12 in which the diallylic phthalate is diallyl ortho-phthalate.

14. The diallylic phthalate resin decorative laminate of claim 13 in which the methylol melamine is hexa(methoxymethyl)melamine.

15. The diallylic phthalate resin decorative laminate of claim 14 in which the methylol melamine is tri(methoxymethyl)tri(alloxymethyl)melamine.

References Cited

UNITED STATES PATENTS

| | | | |
|---|---|---|---|
| 2,811,500 | 10/1957 | Cordier | 260—39 |
| 2,986,541 | 5/1961 | Zuppinger et al. | 260—850 |
| 3,049,458 | 8/1962 | Willard | 161—232 |
| 3,108,030 | 10/1963 | Taylor | 161—232 |
| 3,020,255 | 2/1962 | Magrane et al. | 260—868 |

ROBERT F. BURNETT, Primary Examiner

L. M. CARLIN, Assistant Examiner

U.S. Cl. X.R.

117—161; 260—78.4, 850